Oct. 19, 1971         R. E. ZAUGG         3,613,377
MULTICHAMBER FLOATING BARRIER
Filed July 30, 1969                       5 Sheets-Sheet 1
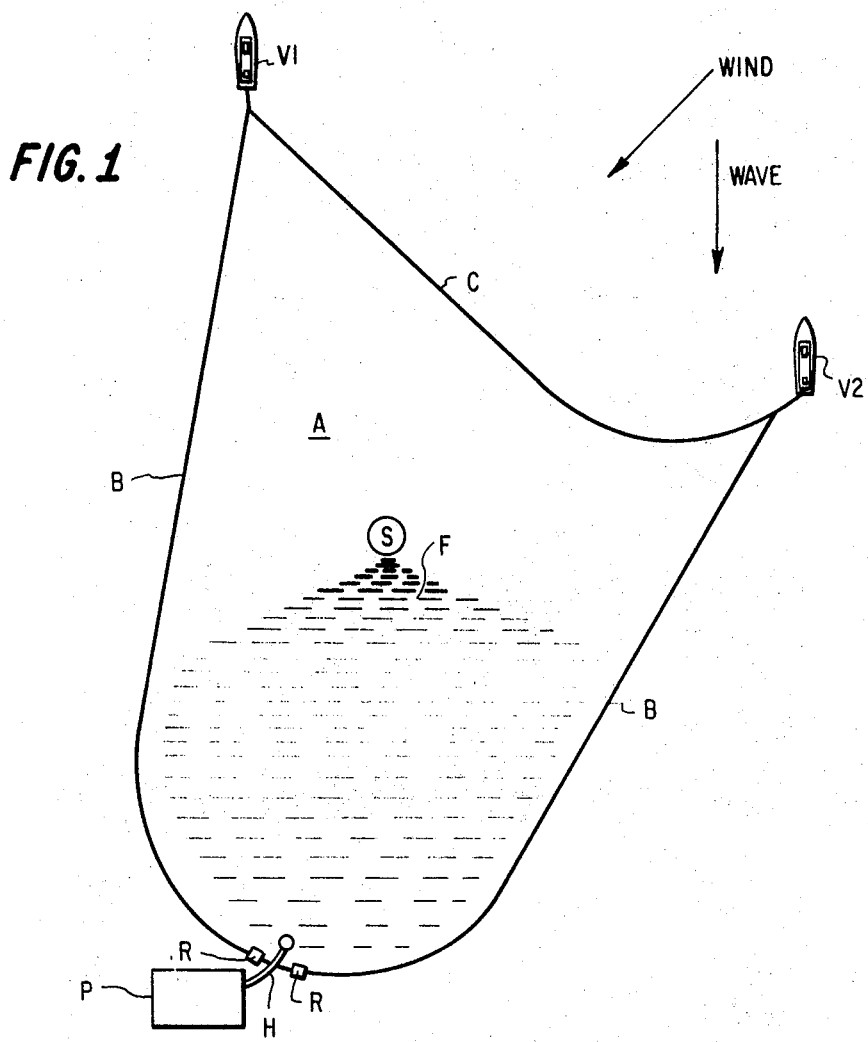
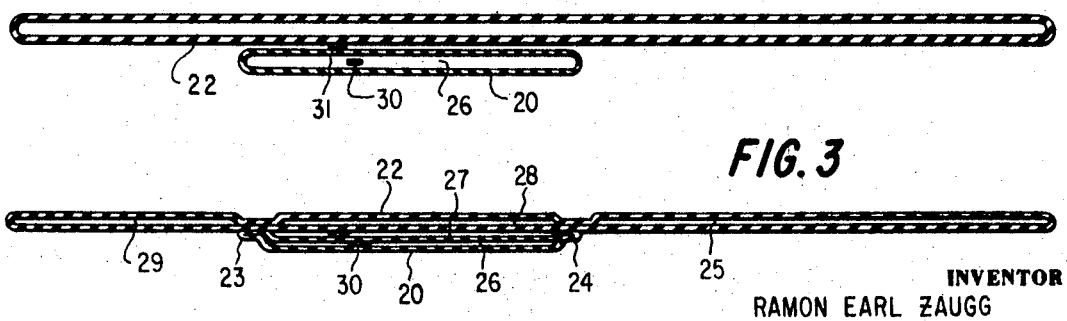
INVENTOR
RAMON EARL ZAUGG
BY *[signature]*
ATTORNEYS

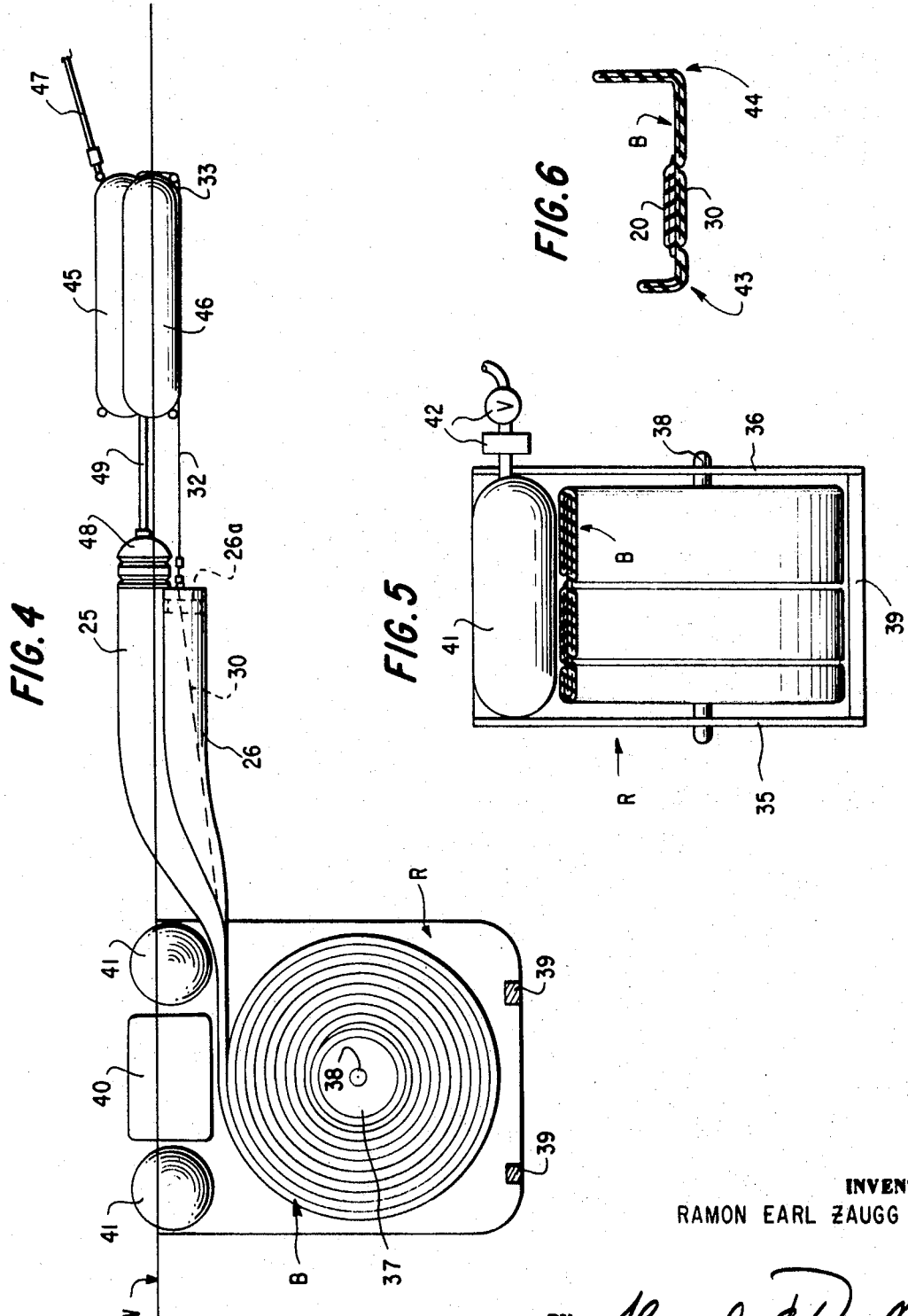

Oct. 19, 1971        R. E. ZAUGG        3,613,377
MULTICHAMBER FLOATING BARRIER
Filed July 30, 1969        5 Sheets-Sheet 3

INVENTOR
RAMON EARL ZAUGG

BY *Alexander & Dowell*
ATTORNEYS

Oct. 19, 1971   R. E. ZAUGG   3,613,377
MULTICHAMBER FLOATING BARRIER
Filed July 30, 1969   5 Sheets-Sheet 4
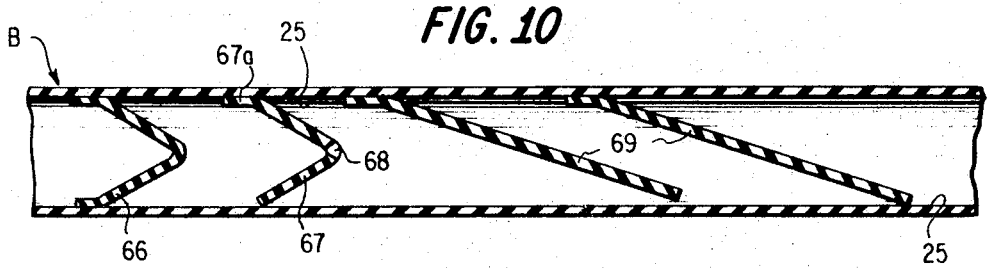
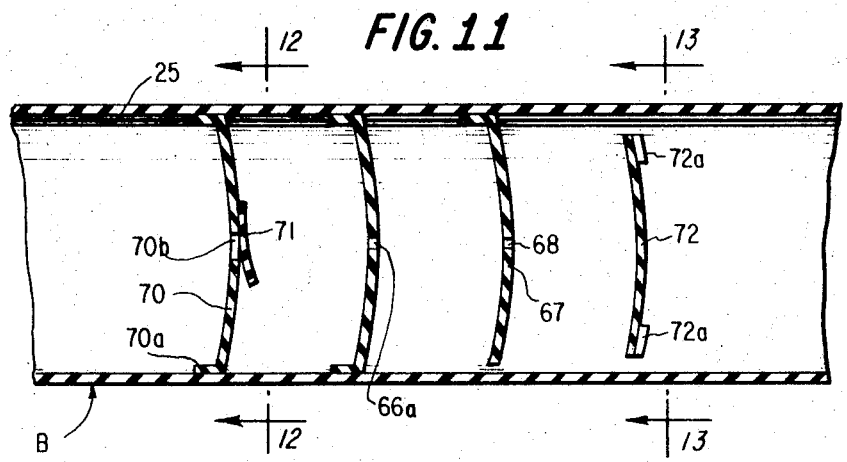
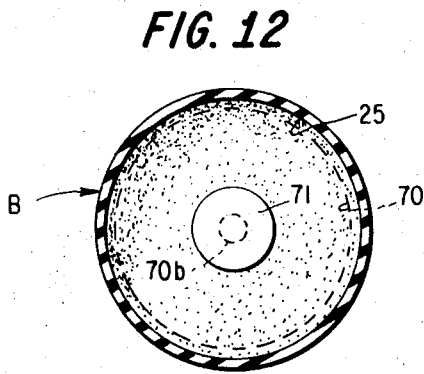 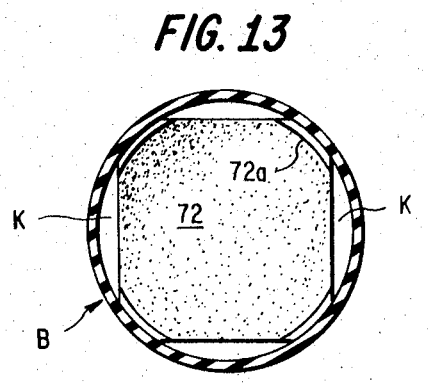
INVENTOR
RAMON EARL ZAUGG

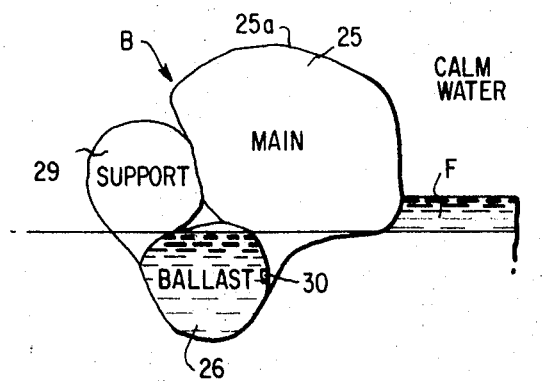
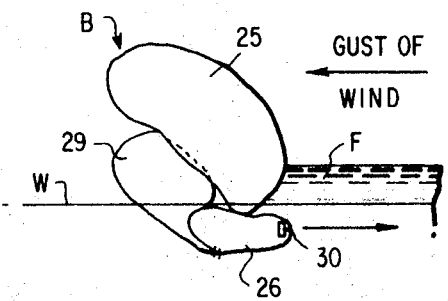
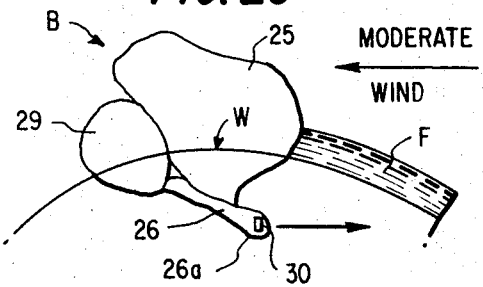
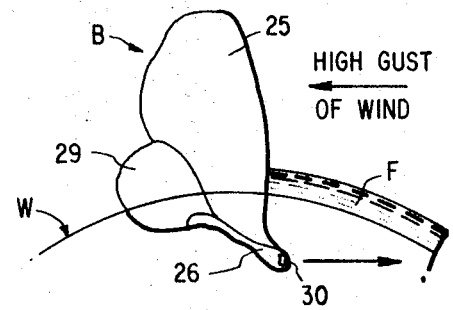
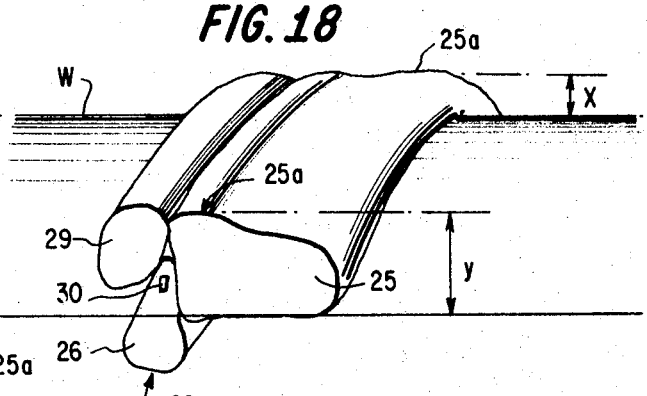
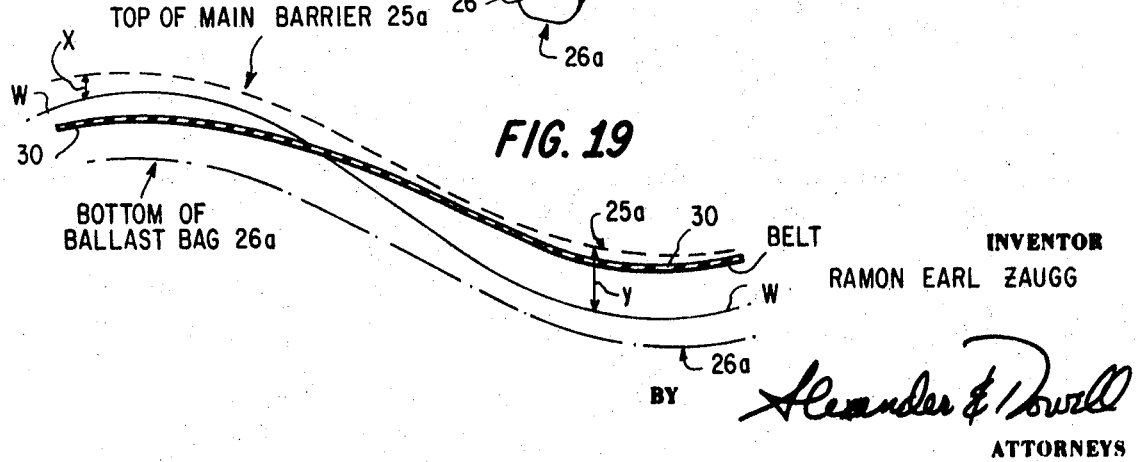

United States Patent Office 3,613,377
Patented Oct. 19, 1971

3,613,377
MULTICHAMBER FLOATING BARRIER
Ramon Earl Zaugg, 14223 Georgia Ave., Apt. 103,
Silver Spring, Md. 20910
Filed July 30, 1969, Ser. No. 846,071
Int. Cl. E02b 15/04
U.S. Cl. 61—1 F                                    11 Claims

ABSTRACT OF THE DISCLOSURE

A multiple-chamber barrier of flexible material adapted to float near the surface of a liquid and confine to a restricted area thereof buoyant materials floating on that surface. The barrier is particularly useful in connection with the present illustrative example for confining buoyant materials such as oil floating on the surface of a body of water, especially during adverse weather or sea conditions when wave activity is high and wind tends to spread the floating material rapidly away from its source, i.e. an oil leak. The present barrier comprises multiple chambers joined to form, when floating, a triangular cluster of flexible bag-like tubes including a ballast chamber partly filled with water and virtually immersed beneath the other chambers so that it lies mostly submerged, a main chamber partially inflated with air and rising above the water surface like a large continuous pillow, and a support chamber more firmly inflated with air and lying above the top of the ballast chamber and behind the main air chamber to help support the latter when the wind tries to beat it flat on the water surface. The invention includes means for manipulating the ends of the chambers including inflating and sealing them, and means for storing and reeling out the barrier to whatever length of it is required under actual working conditions.

---

This invention relates to floating barriers useful in confining buoyant materials within an area bounded by the barrier, and more particularly relates to improvements in the structure of the barrier intended to increase its efficiency in rough water, while at the same time preserving the ease with which it can be handled and deployed under difficult conditions of weather and sea.

It is a principal object of this invention to provide a buoyant barrier which is continuous when deployed and is highly flexible under all conditions of use, so that it can faithfully follow the surface contour of a liquid, especially among wave troughs and crests so that none of the surface-borne floating material can escape the barrier's confinement by passing either over it or under it.

Another principal object of the invention is to provide an improved flexible barrier which in its preferred embodiment includes in combination a weighted ballast portion, a main barrier portion, and a barrier support portion all clustered together in a novel manner to provide a co-operative mutually-supporting composite barrier which stands high out of the water despite severe conditions of wind and wave.

A further object of the invention is to provide a highly flexible self-supporting plastic barrier structure which is strengthened by strain-relief means extending longitudinally through it and housed inside its hollow inflated structure.

It is a general object of this invention to provide a lightweight easily-portable barrier which is entirely self-contained and can be wound up upon a reel like a flat hose. The barrier is easily deployed from the wound-up state either by towing it from the reel using a boat, or by men in appropriate swimming apparatus. The barrier is made of common plastic sheet material such as polyethylene which also has the advantage of being easy to seam-weld so that the structure can be made economically from plural superimposed sheets welded together for the purpose of forming multiple chambers which function in the manner herein described. The ease of storage, and the ease of safety of deployment of the present barrier is improved by the fact that no metal parts or weights are used in its structure, and the barrier is inflated entirely with natural materials which are immediately available at sea and include only air and water.

Another object of the invention is to provide barrier manipulating members for sealing and accessing the hollow interior of the barrier to inflate it either with water or air and to assist in deploying and anchoring the barrier. These manipulating means are of such structure and materials that the combination thereof with the barrier tubes is of manageable overall size, shape and weight, and can be worked by persons at sea using only ordinary knife-blades to cut the barrier so that the men can then insert suitable end members. The ease with which the present structure can be managed under difficult conditions makes the structure useable not only in quiet harbor waters, but also in the open sea. Moreover, the inexpensive plastic material of which the structure is made permits easy and economical disposal thereof after use, for instance either by shredding or by burning the barrier and its end plugs after it is recovered from the sea.

A more specific purpose of the invention is to provide a multiple-chamber barrier of flexible material having at least three chambers in the form of continuous plastic tubes welded together along their lengths and disposed to form a triangular cluster when floating in water. One of the chambers, referred to above as the ballast portion, is partly filled with water, but still contains some air so that the chamber remains very flexible under all conditions. This ballast chamber lies largely submerged in the water with only a minor air filled portion extending above the water level. A second one of the tubes comprises the main air barrier chamber and is partly inflated with air so that it forms a soft high-standing continuous pillow disposed mainly above the level of the water and having a front surface disposed toward said floating material. The third chamber also comprises an air filled tube standing above water level, but it is more fully inflated with air so that it forms a relatively firmer pillow, which however is of smaller diameter than the main barrier chamber and supports the latter behind its rear surface so that the support chamber backs up the main air chamber which extends to windward, or toward the floating materials to be confined. When the pressure of the wind, or of the material being confined, or both, presses against the main barrier chamber, it lies back against the support chamber, is generally at least as high as the support chamber, and usually extends for above the support chamber because of the fact that wind pressure forces the front of the main barrier chamber toward the support chamber, thereby squeezing the first of the main barrier chamber upwardly so that it tends to rise higher in the presence of a considerable wind than its relaxed height under calm weather conditions. On the other hand, the ballast chamber being substantially filled with water, is quite heavy and continues to lie low even if the barrier becomes tensioned and attempts to pull it out of the water as the trough of wave goes by, thereby preventing the barrier from spanning wave crests as would be the case with more rigid barriers of the types shown for example in U.S. Pats. 3,146,598 and 3,321,923.

The present invention can be used to confine a large variety of floating materials or objects upon the surface of another liquid, and its utility is not necessarily limited to the confinemtnt and recovery of oil leaking from a source and floating upon the surface of a body of water.

Other objects and advantages of the present invention will become apparent during the following discussion of the drawings, wherein:

FIG. 1 is a pictorial plan view showing several vessels towing a barrier according to the present invention to maintain it around a slick of oil which is being pumped from within the barrier by a skimmer unit;

FIG. 2 is a cross-sectional view showing several tubes of plastic sheet material comprising the basic material from which a barrier can be formed according to one illustrative embodiment of the present invention;

FIG. 3 is a view similar to FIG. 2 but showing the several tubes seam-welded together to form a practical barrier;

FIG. 4 is an elevation view partly in section showing a barrier according to the present invention being towed from a floating reel during deployment thereof;

FIG. 5 is an end view of the reel shown in FIG. 4 and showing in cross-section the barrier rolled thereon;

FIG. 6 is a cross-sectional view of the barrier being folded in a manner especially suitable for reeling;

FIG. 10 shows a modified form of barrier having several types of baffle means disposed therein, the barrier tube being partially collapsed;

FIG. 11 shows still another form of the barrier tube having several different types of baffles and valve means located therein;

Figure 7:
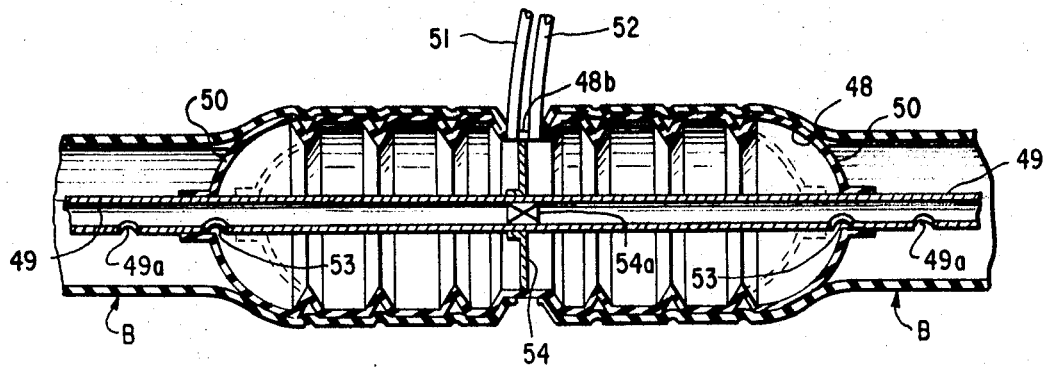
FIG. 7 is a cross-sectional view showing barrier tube ends joined together by an end plug member.

FIG. 12 and 13 are cross-sectional views taken along lines 12—12 and 13—13, respectively, of FIG. 11;

FIGS. 14, 15, 16 and 17 are schematic cross-sectional views taken through a floating barrier under different wind and wave conditions;

FIG. 18 is a diagramamtic cross-sectional view of the barrier passing over the crest of a ware in the absence of wind; and FIG. 19 is a diagram showing the locus of various parts of the barrier of FIG. 18.

Referring now to FIG. 1, a barrier B is shown deployed around a floating mass of oil F in order to confine it so that a skimmer pump P can pump the oil from within the barrier B. The barrier may comprise a single continuous length of tubing, or separate lengths initially deployed from several reels R of the type which will be described in greater detail in connection with FIG. 4. Although for clarity of illustration the reels are shown separated by a considerable distance in FIG. 1, in a practical situation the reels would probably be joined back-to-back, and the hose H from the pump unit would merely be thrown over the top of the barrier or passed beneath it to a floating intake in the confined area A. The barrier B is shown towed behind two vessels V-1 and V-2, although these vessels might alternatively comprise anchored floats merely holding the barrier B into the wind and wave pressures which are driving the floating material F toward the skimmer pump end of the area A. The vessels V-1 and V-2 may be joined together by a cable C, although in the event that anchored buoys are used to support the ends of the barrier B, the cable C might be replaced by additional barrier tubing so as to form a complete enclosure surrounding the area A and preventing escape of oil or other floating material from the source S in any direction. In the configuration of the invention wherein a continuous barrier surrounds the source S, several additional buoys anchored at spaced positions around the area might prove desirable in case of a change of wind and/or wave direction. There are a great many different configurations which a barrier might take in surrounding floating material F, and it is only intended that FIG. 1 illustrate a typical one of them.

Referring now to FIGS. 2 and 3, these figures show how a practical barrier structure can be made using several continuous plastic tubes welded together to form a multiple chamber barrier of very efficient design. Although a minimum of two chambers, namely a main chamber and a ballast chamber, are necessary according to the present invention, it is highly desirable to have at least three clustered chambers, and it is certainly not undesirable to have even more than three chambers available, whether they are all used or not. For instance, the structure shown in FIG. 3 forms five chambers, only three of which are used under ordinary circumstances. However, if one or more of the chambers should become ruptured, the illustrated structure then provides spare chambers which can be used to take over the damaged chamber's function.

The smaller diameter tubing 20, preferably of some flexible thin plastic such as polyethylene, is laid adjacent to the larger tubing 22 and is welded to its at the points 23 and 24, FIG. 3, thereby providing five available chambers of which the chamber 25 is the largest and is used as the main chamber, the chambers 26, 27, and 28 are all the same size and are centrally located so that any of them can be used preferably as a ballast chamber, and chamber 29 is smaller than chamber 25 and can be used to advantage as the support chamber. A strain-relief cord member 30, such as a plastic rope or strap, is preferably provided in one of the chambers and extends the full length of the barrier. This strain-relief member as shown in FIG. 4 extends beyond the end of the barrier and can be attached to a towing float or can be mechanically coupled to its own opposite end in the event that the barrier forms a continuous enclosure about the source S. Alternatively, it may be easier to insert the strain-relief member 31 at the position shown in FIG. 2 between the tubing 20 and the tubing 22 before its is welded together as shown in FIG. 3, thereby avoiding the necessity of threading the strain-relief member 31 through one of the tubing members prior to welding. In any event, the structure shown in FIG. 3 provides a practical barrier of a type whose cross-section is schematically illustrated during use in FIGS. 14, 15, 16, 17 and 18, to be described hereinafter.

Figure 8:
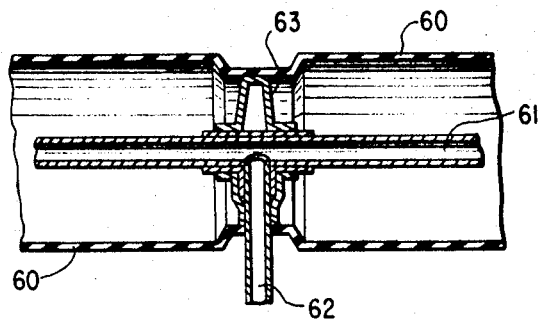
FIG. 8 shows a different type of end plug member.

Referring now to FIGS. 4, 5, and 6, these figures shows a reel R onto which the barrier can be wound for storage purposes prior to deployment. The reel includes two side plates 35 and 36 and a central drum 37 supported axially on a shaft 38 rotatably supported in the end plates. The end plates are joined together by suitable spacers 39 and include a float member 40 designed to maintain the reel in upright position as shown in FIG. 4 with respect to the surface of the water W. The reel member also carries one or more compressed air bottles 41 having suitable regulator and valve means 42 which can be connected to the air intake ducts of suitable end plug members, as shown in FIGS. 7 and 8 and described hereinafter for the purpose of inflating the barrier member after it has been pulled from the reel, cut to the desired length, and had the end members inserted as shown in FIG. 7. The float 40 overcomes the weight of the filled compressed air bottles 41, and the reel assembly may be further weighted in any manner necessary to cause it to float in upright position with the reel axis horizontal as shown in FIG. 4. In the event that the barrier member takes the form shown in FIG. 3, it can be folded at the positions 43 and 44 as shown in FIG. 6 in order to reduce it to a narrower overall width and provide it with a substantially uniform thickness so that it can be rolled in the manner of a flat ribbon upon the drum 37 of the reel R.

Figure 9:
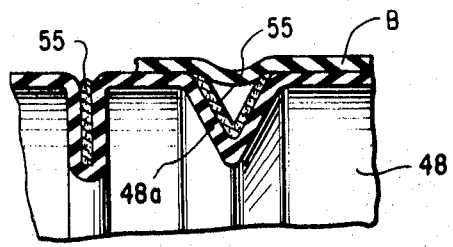
FIG. 9 shows still another modified form of the barrier plug member including an adhesive for joining the tube ends to the plug member.

FIGS. 4, 7, and 9 show the manner in which chambers of the barrier B can be selectively closed at their ends and suitably filled with water or air for use as described hereinafter. Because of the fact that the length of the barrier tubing required to accomplish a particular purpose will depend upon the circumstances of its use, the length of tubing required to be taken from the reel R is a variable. Accordingly, it is necessary to provide some satisfactory manipulating means including means for closing or joining the cut ends of the plastic barrier tubing and means for mechanically coupling to the barrier for towing purposes. It should be noted that under actual use conditions it may be relatively difficult to perform the necessary closing functions at sea, and therefore simplicity of the end closures is highly desirable.

The plug 48 is a hollow accordian pleated body having rounded close ends and divided by a barrier 54. Tubing 49 passes completely through the plug 48 and is sealed to the barrier 54. However, the end members are not fixed thereto, but are a snug sliding fit on the tubing so that starting with the plug initially collapsed, and the end members 50 in the positions shown in dotted lines, either side of the plug can be selectively extended to the position shown in solid lines by pressurizing the associated inflation tube 51 or 52. The pressure within that side of the plug will cause it to extend and slide the end 50 along the tubing 49 until it passes the hole 53 and vents the pressure into the barrier B. Thereafter, the tube 51 or 52 can be used to control the air pressure within the barrier. The introduction of an optional plug 54a into the center of the tubing 49 will permit separate access to opposite ends of the plug and attached barrier B, which may in fact comprise opposite ends of the same chamber tube. In this configuration, one of the tubings 51 can be used as an inlet duct, and the other tubing 52 can serve as an exhaust port, for example, when entering water in the tube 51 while allowing air to escape through tube 52. All that is necessary to connect to a chamber of the barrier is to cut it off squarely with a knife, and slide the plug into it as shown in FIG. 7. The holes 49a are useful for the purpose of tying the ends of the strain relief cord when the plug assembly is used in the ballast chamber.

A modified type of accordian pleated plug is shown in FIG. 9 in which the plug when new is supplied in an axially comressed condition with adhesive material 55 in the closed V-shaped pleated portions 48a of the duct. In use, the plug is elongated axially to open the V-shaped pleats 48a after the barrier tube has been slid over the plug so that the adhesive 55 then comes into contact with the inside of the barrier B without first having been wetted to any significant extent even though this operation may be performed under water during a practical application of the plug. This arrangement is very useful when the plug is being used by scuba divers while deploying a barrier under difficult conditions.

Another possible way of using the manipulative means including the plug 48 is as shown in FIG. 4 in which the tubings 51 and 52 are removed from the plug 48, or are bent into the groove around the center of the plug as shown at 48b so that only the open end of the tubing 49 extends out of the end of the plug. This tubing 49 with the small plug 54a removed can then be coupled to several air cylinders 45 and 46 which are connected to a tow rope 47 going to a boat. As the barrier is pulled from the reel R as shown in FIG. 4 by the tow rope 47, the cylinders 45 and 46 will inflate the one or more chambers of the barrier to which they are coupled by plugs 48. In this type of manipulation the strain-relief belt 30 would be physically connected to a short cable 32 coupled to the frame 33 of the towing device which supports the air cylinders 45 and 46. Moreover, in this towed embodiment the ballast chamber, for instance the chamber 26 of FIG. 3 would be held open and preferably propped open by a suitable ring 26a inserted therein so that the rightward towing motion imparted by the cable 47 will tend to fill the ballast chamber 26 with water as the barrier is being unreeled in collapsed state while being deployed. Alternatively, another plug similar to the plug 48 can be used to connect the ballast chamber 26 with a hose (not shown) whose other end is connected to a pump in the towing vessel for the purpose of pumping water under pressure into the ballast chamber 26. Since there are two air filled chambers including, the chamber 25, and the chamber 29 (located behind it and therefore not visible in FIG. 4), a plug similar to the plug 48 of FIG. 7 is inserted in each of these chambers and each has its tubing 49 connected to a different source of air pressure so that the two air chambers 25 and 29 can be inflated to different pressures. This is one reason why two different air bottles 45 and 46 are shown in the drawing of FIG. 4.

Referring now to FIG. 8, this modified plug 60 instead of having the tube 49 provided with a barrier such as the plug 54a in its center, provides a tube 61 having a T-section branch tube 62 connected into it so that both ends of a connected barrier B are joined together and accessed simultaneously. The web 63 in the center of the plug 60 has dual walls which serve as a support and guide for the tubes 61 and 62 and at the same time prevent seepage where the tube 62 passes through the plug 60 from entering into the barrier itself. The tubing 61 is also supported by the opposite ends (not shown) of the plug 60 which are similar to the ends 50 of the plug 48 in FIG. 7. Optionally, the plug 60 may either be pleated or not as desired. All of the plug configurations shown in FIGS. 7, 8 and 9 can be used either for the purpose of closing an air chamber, such as the main or the support chamber, or alternatively for closing the water ballast chamber. In the latter case, the separately accessible sides of the dual-tube plug of FIG. 7 might be more easily used since water could be entered in one of the tubes such as the tube 51 while air is exhausted from the other tube 52 in the case where the ballast chamber after having been closed by the plug 48 forms a continuous ring.

Referring to FIG. 10, this figure shows a partially collapsed chamber, such as the chamber 25 of the barrier B. This is an air chamber and may include one of several types of baffles inside it. For instance, the baffle 66 is sealed all the way around to the walls of the chamber 25, and therefore would form a definite closure capable of maintaining the water-tight integrity of most of the barrier even though a section beyond the baffle 66 might have been damaged. However, such a sealed baffle as is shown at 66 would require the use of additional inflation access plugs to be inserted periodically in the system, at least one between each pair of baffles 66.

Another modification comprises the baffle 67 which has a small air hole 68 near its center permitting slow inflation of the barrier chamber 25 so that as the barrier is pulled from the reel R in FIG. 4 each section between barriers 67 would tend to inflate almost fully before enough air could escape through the small hole 68 to fill the next chamber section. The baffle 67 would be sealed only part of the way around its periphery as at 67a to the inner wall of the chamber 25 and the baffle disc 67 would be made slightly larger than the fully inflated diameter of the chamber 25 so that it would maintain a fairly good seal against it at all times.

The other two baffles 69 within the chamber 25 of the barrier B are connected only part way around to the inner wall of the chamber so that they always lie in a diagonally disposed position within the chamber. Thus, when air is entered from left to right into the chamber 25 the baffles 69 can rise away from the lower wall of the chamber and permit air to pass. On the other hand, the air is restricted from escaping by moving from right to left and will at least be greatly hampered in its efforts to escape, and therefore the baffles 69 will behave like check valves. This is very desirable in some applications, especially where there is substantial likelihood that the chamber might be ruptured by external causes.

Moreover, in connection with all three fluid filled chambers, the flow of fluid through a small opening in the chamber can also be desirable for another reason. The fluid will tend to equalize in the chambers between baffle zones over a period of time so that the massaging action of waves on the barrier will have less tendency to squeeze the fluid from one longitudinal zone of a chamber toward another in such a way as to cause partial collapse of the chamber near the crest of a wave and filling to excessive hardness of portions of the chamber in the trough of a wave.

As pointed out above as the barrier is pulled off of the reel shown in FIG. 4, each section tends to inflate comparatively fully before pushing a large volume of air into the next section where small-aperture baffles are used, thereby aiding in the orderly inflation of different longitudinal zones of the chamber to approximately the same pressures. In FIG. 11 the barrier tube is shown fully inflated, and the baffle 66 is shown performing in this manner through a small hole 66a. The baffle 67 also has a small air hole in its center, but when the chamber 25 is fully inflated it does not touch its bottom surface, thereby permitting any water in the chamber to equalize its level. The baffle 70, shown in FIGS. 11 and 12, is a plastic disc sealed to the inner chamber wall all the way around the chamber as at 70a, and having an opening 70b through its center with a flap valve 71 disposed over the opening. This arangement permits the travel of fluid from left to right within the chamber 25, but prevents its travel from right to left in the same chamber. To this extent, its function resembles rather closely the check valve performance oft he baffles 69 shown in FIG. 10. These baffles will provide a rather tight check valve action which during actual use would probably be further sealed by moisture within the barrier tubing forming the chamber as a result of condensation of the air against the cold sides of the chamber.

Still another type of baffle is shown in FIGS. 11 and 13 at the reference numeral 72, this baffle being tacked to the side walls of the chamber 25 at four locations 72a to provide a baffle which can easily fold up flat when the chamber 25 is collapsed during storage. The rate of leakage around this baffle is determined by the size of the clearance spaces K shown in FIG. 13, and will be especially useful within the water-filled portions of the chambers to inhibit undesirable migration of the water in the chamber due to wave action thereon. FIGS. 10 through 13 show only some of the possible baffle forms which may be found useful in connection with particular applications of the present invention, some of the small-leakage baffles being especially useful in providing a barrier which can be maintained inflated by the continuous introduction of a small amount of compressed air at one end of the baffle without providing a complete closure at the other end of the baffle, in view of the fact that the air will leak from the other end only at a very slow rate because of the smallness of the escape openings at the baffles.

BARRIER OPERATION

Once the present barrier structure has been deployed and inflated it has two basic problems to contend with, one is wave movement and the other is wind movement. The latter movement is relatively easier to contend with because of the fact that the support chamber 29 as shown in FIG. 14 is inflated to a relatively higher pressure than the main chamber 25, and therefore the support chamber 29 floats fairly stiffly on the surface of the water above the ballast chamber 26. Ordinarily, the main chamber 25 lies on the surface of the water slightly depressed on top since it is not fully inflated. When the wind blows moderately against the front surface of the main chamber 25, as shown in FIG. 15, it tends to retreat leftwardly and its rear surface rests upon and partially covers the support chamber 29. Since the entire barrier tends to move leftwardly, the strain-relief belt 30 tends to pull rightwardly to oppose such movement and the ballast chamber 26 elongates. Therefore, the device tends to assume the position shown in FIG. 15, wherein the ballast chamber 26 has collapsed somewhat due to the flow of water from it into lower portions of the ballast chamber momentarily in a wave trough, in view of the fact that FIG. 15 shows the portion of the barrier B which is riding the crest of a wave having an elevated waterline W.

If the water is relatively calm and flat in the vicinity of the barrier B as shown in FIG. 16, the ballast chamber 26 recovers some of its water inflation, but is still elongated horizontally because the barrier B is straining against the relief belt 30. In the presence of a strong gust of wind, the support chamber 29 lies out somewhat flatter on the surface and the main chamber 25 lies still further over it, as shown in FIG. 16. FIG. 17 shows a gust of wind of high velocity striking the barrier B and still further elongating the ballast chamber 26 at the peak of the wave. However, under this condition the main chamber 25 rises to its highest peak since the front surface of it tends to be flattened by the wind and since the rear surface of it is still supported by the support chamber 29 which is held in its same position essentially by the elongated ballast chamber and the strain-relief belt 30. It is important to note, however, that in all cases shown in FIGS. 14 through 17 the top of the 29a barrier has not approached the surface of the water W but has remained well above the level of the floating material F which it is confining.

FIG. 18 shows the manner in which the barrier lies over a wave travelling axially of the barrier in the absence of a significant amount of wind. This action is also illustrated graphically in FIG. 19 which shows the relative positions of the various portions of the barrier assembly as a wave passes it. FIG. 19 shows the outline contour of a wave W, and the curve followed by the plastic strain-relief belt 30. When the top of a wave is going by, the belt tends to pull down low under water, but when the bottom of the wave or trough goes by, the strain-relief belt 30 tends to pull up out of water. In other words, the belt seeks to retain a straight-line configuration, although unsuccessfully. Near the crest of the wave, both the bottom of the ballast bag 26a and the strain-relief belt 30 are well below the water level. At the crest, the top of the main barrier bag 25a is located at its smallest distance above the surface of the water, namely the distance $x$. This is satisfactory because most floating material such as oil tends to remain in the troughs and only a thin layer of it tends to appear near the crest of the wave. On the other hand, still referring to FIG. 19, at the trough of the wave the top of the bag 25a comprising the main barrier is located at its greatest distance $y$ above the water W, and this is as it should be in view of the fact that the oil slick is thickest in the troughs. At the bottom of the trough the strain-relief cable 30 pulls up above water level, but the bottom of the ballast bag 26a still sags below water level because of the weight of the water contained in the bag. Accordingly, it will be seen that unless excessive tension is pulled in the strain relief belt 30, the ballast bag will never be lifted out of water altogether. By using a braided nylon webbing, sufficient internal stretch will be provided in the strain-relief belt 30 so that it normally cannot be pulled taut enough to raise the ballast chamber entirely out of water in a wave trough, or taut enough to unduly submerge the barrier near the crest of a wave.

Other modifications of the invention are within the contemplation of the present disclosure, and include for instance more than two or three chambers inflated with fluid, including the coating of the surfaces of the chambers with aluminum to make them reflective so as to cause them to remain cool under conditions which may generate excessive heat, including bright sun-light and including possible conditions where there is a fire burning on the surface of the water in the vicinity.

Having thus described working embodiments illustrative of my invention, I now present the following claims.

I claim:

1. buoyant barrier for confining material floating on the surface of a liquid within a restricted area when the barrier is deployed thereabout, comprising at least three elongated flexible tubes disposed longitudinally adjacent to one-another and joined together along their longitudinal surfaces to form when viewed in cross-section a cluster of discrete chambers at least two of which are partially inflated with air, and at least one other of said chambers comprising a ballast chamber containing ballasting material, the ballast chambers being disposed between the inflated chambers and being joined to them at locations on substantially opposed sides of the ballast chamber so that when the cluster is immersed in the liquid the ballast chamber lies below the inflated chambers which extend upwardly out of the liquid for a distance which is greater than the spacing between said locations where they are joined thereto, said two partially inflated chambers being less than fully inflated to such a degree that they stand up above said liquid surface with generally indefinite contours, but being inflated sufficiently that they are normally in contact with each other and that when a wind blows one chamber toward the other said one chamber will lie generally over and be supported across a large proportion of its surface area upon the other.

2. In a barrier as set forth in claim 1, said cluster when immersed comprising said at least three chambers disposed in substantially triangular configuration when viewed in cross-section, said two inflated chambers being uppermost and the ballast chamber containing liquid ballasting material.

3. In a barrier as set forth in claim 2, a main one of said inflated chambers being cross-sectionally larger than the others and being partially inflated to form a soft pillow having a front surface disposed toward the material floating in said area and an opposed back surface, a second one of said inflated chambers being inflated more fully to form a firmer pillow located to support the main chamber along its back surface, and the ballast chamber being joined at locations spaced apart across its surface respectively to each of the other two chambers and containing said ballasting material.

4. In a barrier as set forth in claim 3, plug means sized to slide into and fill and close the open ends of selected ones of said tubes to seal the latter, and at least some of the plug means having access tubes extending through them and communicating with said chambers from outside, through which to control the inflation of the chambers.

5. In a barrier as set forth in claim 4, said plug means comprising resilient plastic tubular members having plural annularly extending pleats whereby the plug means can be selectively collapsed and elongated in longitudinal directions, and said pleats being filled with adhesive material so disposed that it is substantially protected from wetting when the plug means is in collapsed condition, said adhesive material contacting and sealing against the inner surface of a tube when the plug means is inserted into its chamber and elongated therein.

6. In a barrier as set forth in claim 3, strain-relief cord means included within said cluster below the inflated chambers and extending longitudinally through the cluster, means for closing the ends of the chambers, and means for manipulating the ends of the barrier when deploying the latter including means attached to said strain-relief cord.

7. In a barrier as set forth in claim 3, at least some of said chambers having baffles therein incompletely sealing the chamber to permit fluid flow therepast at a restricted rate, and some of said baffles being constructed to substantially completely seal the chamber when the latter is in a partially collapsed condition.

8. In a barrier as set forth in claim 3, at least some of said chambers having baffles therein constructed to seal the chamber against flow of air therethrough in one longitudinal direction only.

9. In a barrier as set forth in claim 1, said chambers comprising highly flexible plastic sheet material longitudinally seam-welded together to form multiple tubes when inflated and lying substantially flat when deflated, a strain-relief cord extending through a tube other than one of said air inflated chamber tubes, means for selectively closing at least one end of some of the tubes, and barrier deploying and manipulating means attachable to said closing means and to said strain-relief cord.

10. In combination with a barrier as set forth in claim 9, for use in confining material floating on a body of water, a frame, a reel rotatably mounted about its axis in said frame for storing the flexible sheet material tubes wound thereon in deflated condition, said frame including bouyant means for floating it upright with the reel axis horizontal, and said manipulating means including compressed air tank means coupled to said tube-closing means and introducing air thereinto, the barrier unrolling from the reel and inflating when said manipulating means is towed away from the reel in the water.

11. In the combination as set forth in claim 10, said barrier including at least two air inflated tubes coupled to said air tank means, and including a ballast tube to be substantially filled with water, and open ring means inserted in the ballast tube end to hold it open, whereby the towing motion of the barrier through the body of water partially fills the ballast tube as it is unrolled from the reel.

References Cited
UNITED STATES PATENTS

| | | | |
|---|---|---|---|
| 2,228,529 | 1/1941 | Moeller | 61—5 X |
| 3,067,712 | 12/1962 | Doerpinghaus | 61—5 X |
| 3,363,268 | 1/1968 | Friedlander | 52—2 X |
| 3,476,246 | 11/1969 | Dahan | 61—1 F |
| 3,503,214 | 3/1970 | Desty et al. | 61—1 F |

FOREIGN PATENTS

| | | | |
|---|---|---|---|
| 94,595 | 7/1959 | Norway | 61—5 |

PETER M. CAUN, Primary Examiner